Patented Oct. 11, 1938

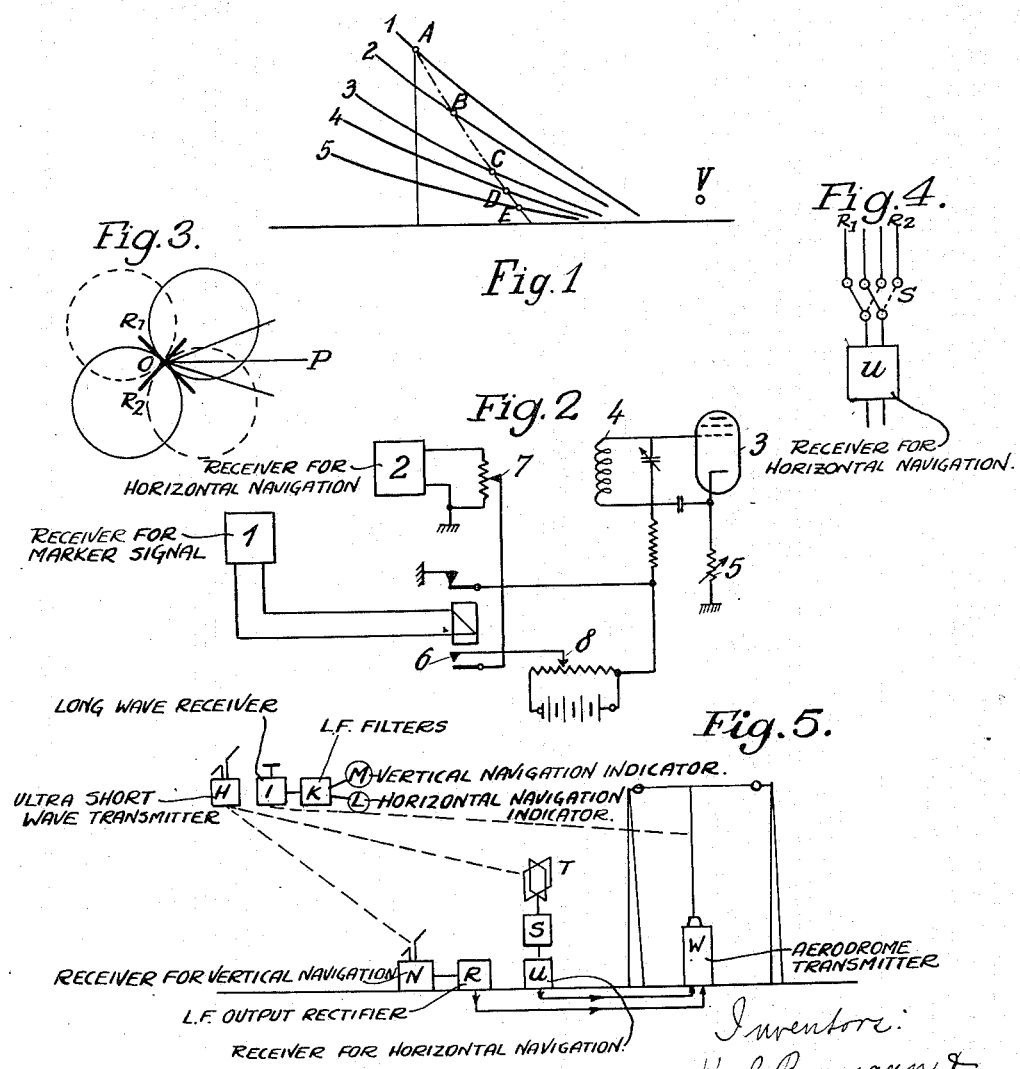

2,132,599

UNITED STATES PATENT OFFICE 2,132,599

LANDING MEANS FOR AIRCRAFT

Karl Baumann, Basel, and Armin Ettinger, Birsfelden, near Basel, Switzerland

Application January 31, 1936, Serial No. 61,720
In Switzerland December 23, 1935

5 Claims. (Cl. 250—11)

This invention relates to a method of and means for assisting the landing of airplanes.

To assist the landing of aircraft when there is little or no visibility it is necessary for the pilot to be notified in some form that he is in the proper direction for landing and that he is gliding down along a path suitable for the particular landing ground concerned, and for this purpose a method has already been proposed which makes use of different levels in the radiation field of a transmitting aerial or aerial combination, a transmitter being provided on the ground and a receiver in the airplane see for instance: E. Kramar: The present state in the art of blind landing of airplanes using ultra-short waves in Europa. Proc. I. R. E., vol. 23, page 1171, October 1935.

The primary disadvantages associated with this arrangement consist in the first place in the fact that the more sensitive of the two apparatus, viz., the receiver, is located on the airplane, so that there are considerable interferences in the reception, due chiefly to the ignition system of the engine. To overcome these interferences the transmission output must accordingly be very high. Secondly, there is no possibility of controlling the glide of the aircraft during the landing operation on the ground.

To avoid the disadvantages aforesaid it has, therefore, also been proposed to locate the transmitter on the aircraft and to provide the receiving system on the ground, the landing glide of the aircraft being determined by a level of the receiving aerial system. The receiving apparatus controls automatically a transmitter on the ground, and the control signals received by the aircraft, for example by means of a normal receiver, are made noticeable to the pilot either acoustically or optically.

Now in this latter method, in which the exact horizontal and vertical line of movement of the aircraft when approaching the ground is determined by the signals received, i. e., in which the gliding path is defined as level in the field of the receiving aerial arrangement provided on the ground, it has been found that the glide becomes very flat towards the end. In consequence there is always a certain danger in association with comparatively high points or obstacles situated in the line of flight in the immediate vicinity of the aerodrome.

It is the object of the invention, therefore, to provide a method and means by which the line followed by the airplane when gliding to earth may be adapted as desired to local landing conditions.

The invention accordingly consists in the fact that the output potential of the receiver on the ground for the horizontal navigation varies automatically, from a certain point of approach of the landing airplane, the amplification of the receiver in respect of the vertical navigation, in such fashion that the pilot, in order to maintain constant the intensity of the signals received, is compelled to descend at an angle which intersects the levels in the field of the receiving aerial in respect of the vertical navigation.

The invention will now be described more fully with reference to the accompanying drawing, in which Fig. 1 indicates diagrammatically the landing operation in accordance with the invention, Fig. 2 is a circuit diagram relating to the transmission of the signals.

Fig. 3 is a diagrammatic plan view of the directional aerial for the receiver for horizontal navigation.

Fig. 4 is a diagrammatic view of the receiver for horizontal navigation and the change-over device interposed between it and the directional aerial.

Fig. 5 is a diagrammatic view hereinafter referred to.

For determining the horizontal direction of approach towards the landing ground there are employed the directional characteristics of two crossed receiving loops $R_1$ and $R_2$. Fig. 3 shows these two loops $R_1$ and $R_2$ with their horizontal directional characteristics in plan. The circles in dotted lines represent the receiving characteristic of the loop $R_1$ and the circles in full lines the receiving characteristic of the loop $R_2$. The output potentials of the two loops, with equal construction of the loops, are alike when a wave arrives in the direction PO which is the direction of landing. If now an airplane approaching the landing field in the direction PO, which line of direction divides the angle between the planes of the two loops into two equal angles, transmits by means of a transmitter a continuous tone, then the output potentials created in the two loops are alike. If there is a deviation from the proper landing direction towards the right, the output potential of the one loop, owing to the transmission of a continuous tone by the ultra-short wave transmitter on the airplane, is greater than that of the other loop. Upon deviation towards the left the position is exactly vice versa. For the purpose of obtaining a greater relative sensitivity to fluctuations in the direction the loops may be disposed at an angle which is greater than 90°. The output of the two loops is applied alternately by means of a mechanically operated switch-over device S (Fig. 4) to a receiver U, in such fashion that the period of connection varies in respect of the two loops. The mechanically operated switch-over device S may be driven by a motor adapted to connect the movable pair of switch members alternately with the terminals of the two loops $R_1$ and $R_2$. The direct current resulting after rectification of the low-frequency output of the said receiver is employed to control the amplitude of a tone produced by a tone generator, the frequency of which differs from the modulating frequency of the ultra-short wave transmitter on the airplane.

This locally generated frequency, which is dependent as regards amplitude on the output of the said receiver, is then applied as modulation to the aerodrome transmitter. The signals of the aerodrome transmitter may be received by the aircraft with a normal long-wave receiver. If the direction of the airplane exactly coincides with the landing direction, the two loops will be acted upon equally by the ultra-short wave transmitter on the airplane.

Upon the changing over of the loops there is then no jump in the sound intensity at the output of the receiver U. The modulation of the aerodrome transmitter corresponds, therefore, with a continuous tone without jump in intensity, and indicates to the pilot, who receives the signals with the long wave apparatus, that he is flying in the correct direction of approach. If his course deviates from the mid-position towards the right, the one loop is acted upon by the ultra-short wave transmitter to a greater extent than the other, and the one signal, for example the shorter one, will be louder than the other. Upon deviation towards the left the longer signal will be louder than the shorter one. In this way it is possible to distinguish between the two sides.

For the vertical navigation another receiving aerial arrangement on the ground is acted upon by the waves transmitted by the ultra-short wave transmitter on the airplane. An example for such an arrangement of antennas see for instance Diamond and Dunmore: A radio beacon and receiving system for blind landing of aircraft. Proc. I. R. E., vol. 19, Fig. 7, page 596, April 1931. There is described an arrangement for the transmitting case, but all concerning the vertical characteristic holds also for the receiving case. The glide path is laid down as an equal intensity line in the vertical characteristic of the receiving antenna arrangement. The direct current of the low-frequency output of this receiver on the ground controls the amplitude of a second sound generator, the frequency of which differs from that of the sound generator previously referred to. The output of this second sound generator likewise modulates the aerodrome transmitter.

For the purpose of explanation it is assumed that an airplane is flying at a certain altitude in the direction of landing. The output potential of the ground receiver continuously increases, and in accordance with the method above described is notified back to the airplane.

If the movement on the part of an instrument in the airplane actuated by the answer-back signal reaches a certain value which is individual to the particular aerodrome concerned, the pilot commences to descend and, whilst maintaining the landing direction, steers his machine in such fashion that the instrument actuated by the answer-back continues to show the same extent of movement, in which case he glides down to the ground along the prescribed landing curve.

The two modulation tones (for horizontal and vertical navigation) are separated by low-frequency filter chains in the receiver on board the airplane.

It is also possible to provide at a suitable point a receiver combined with an aerial arrangement, which has such a vertical characteristic, that when passed over by the ultra-short wave transmitter transmitting on board the aircraft develops for a brief interval an output voltage keying a third tone generator and applying this low-frequency voltage as modulation frequency to the aerodrome transmitter. This modulation frequency, when received in the airplane provides indication that landing should be commenced (marker signal).

Fig. 5 illustrates diagrammatically the method described in the foregoing. H represents the ultra-short wave transmitter in the aircraft, I the normal long wave operating receiver with automatic sound-volume control in the aircraft, K are the low frequency filter chains by means of which the answer-back signals of the aerodrome transmitter modulated with different sounds are separated, L and M are the indicating means for the horizontal and vertical navigation, N represents the receiver for the vertical navigation, R the low frequency output rectifier for the vertical navigation, T the loop system for the horizontal navigation, S the changeover device for the loops, U the receiver for the horizontal navigation, and W is the aerodrome operating transmitter.

The method as described up to now constitutes in all details part of the known art, and no claim whatsoever is made to the same per se.

Referring now to Fig. 1, the curves 1 to 5 indicate different levels in the field of the receiving aerial V. The different curves correspond with different values of the intensity of the field. The top curve indicates the greatest and the bottom curve the lowest intensity of the field.

In landing without the regulation provided for by the invention the line of flight would coincide with one of the curves 1 to 5. If now the amplification of the receiver on the ground for the vertical navigation is increased from a certain point of approach, such as A, which corresponds with the distance X from the aerial system for the vertical navigation, the pilot, in order that the output of the ground receiver for the vertical navigation, and accordingly the intensity of the vertical navigation signals transmitted to the airplane, remain constant, must steer the machine so as to intersect the curves 1 to 5, for example at the points A, B, C, D and E, so that proceeding from the point A the angle of descent becomes steeper.

This method may best be explained in conjunction with a particular form of embodiment: The ultra-short wave transmitter on the airplane acts on the ground receivers for the marker signal, the horizontal navigation and the vertical navigation. The aerial system of the receiver for the horizontal navigation should be such that its output potential depends primarily on the distance of the airplane transmitter. The aerodrome receiver for the vertical navigation operates without regulation up to the moment when the airplane with the ultra-short wave transmitter on board transmitting flies over the antenna arrangement of the marker signal receiver and so actuates the marker signal, which at the same time indicates by its location the nearest obstacle in the direction of landing in the vicinity of the aerodrome. Up to this point, therefore, the airplane in descending follows a normal level of the aerial system in respect of the vertical navigation.

When the airplane with the ultra-short wave transmitter transmitting on board passes over the antenna system connected with the receiver for the marker signal the antenna yields an input voltage to the marker signal receiver. The output voltage of this receiver is only present when the transmitter on board penetrates the vertical lobe of the vertical diagram of the associated antenna arrangement of the marker signal receiver. This output voltage switches on automatically by means of a relay the regulation of amplification of the ground receiver in respect of the vertical navigation. The voltage regulating the amplification of the receiver for the vertical navigation is deducted from the output of the receiver for the horizontal navigation. This regulation voltage is substantially proportional to the distance of the airplane from the receiver for horizontal navigation. In the receiver for the vertical navigation are provided one or more tubes having a variable and adjustable amplification factor. The regulation voltage deducted from the output of the receiver for horizontal navigation is applied to the regulation grids of these tubes thus affecting the amplification of the receiver for vertical navigation in proportion of the distance of the ultra-short wave transmitter on board the airplane to the antenna system of the receiver for horizontal navigation.

In Fig. 2, 1 is the receiver, which can be of the normal superheterodyne type, with its antenna system having a vertical characteristic with the main lobe directed upwards. 2 is the receiver for the horizontal navigation with its two crossed loops. 3 is a variable high-frequency pentode provided for instance as a stage in the intermediate frequency amplifier of the receiver for the vertical navigation or as an input stage of this receiver. In the first case the grid circuit 4 is tuned to the intermediate frequency of the receiver, in the second case to the frequency of the ultra-short wave transmitter in the airplane. With the aid of resistance 5 the working point of the tube 3 is set at a point of low amplification factor, the resistance 5 giving a fixed bias to the regulation grid of this tube, when the upper two contacts of relay 6 are closed. So long as the marker signal receiver has no input voltage applied thereto due from the transmitter on board the airplane the tube works constantly at this point of its characteristic. When flying over the antenna system of the marker signal receiver, however, the relay 6, actuated by the output voltage of the marker signal receiver, by closing the two lower contacts and opening the two upper ones, applies a part of the output voltage of the horizontal navigation voltage, which is tapped at the potentiometer 8, to the regulation grid of the tube 3 of the vertical navigation receiver. The potentiometer is so adjusted, that, when the marker signal receiver is flown over at the correct altitude, the potential tapped by way of the potentiometer 7 is just compensated, so that upon the switching over of the relay 6 the amplification of the tube 3 is not altered.

After the receiver 1 is overflown the regulation commences to take effect, in such fashion that the amplification of the receiver for the vertical navigation becomes all the greater the nearer the aircraft approaches the receiver for horizontal navigation, thus giving a glide path steeper than without regulation. It is clear, that the relay 6 must be of such a construction, that the contacts are fixed in their position, when once the two upper are opened and the two lower ones are closed, because the current through the coil of relay 6 flows only during the time, when the airplane with the ultra-short wave transmitter transmitting on board is transversing the vertical lobe of the diagram of the marker signal antenna system. Such relays are known (Impulse relays). When the landing is made the contacts must be brought back to their initial position. This can be effected by giving an impulse over the coil of the relay given by the wireless operator of the aerodrome.

If the antenna system of the marker signal receiver is not passed at exactly the correct altitude, then the voltage tapped at potentiometer 7 does not exactly compensate the voltage tapped at potentiometer 8. Thus a jump occurs in the amplification of the tube 3 upon the switching over of the relay 6. From the answer-back message received by the pilot the latter is able to ascertain whether the machine was flying over the marker signal receiver too high or too low. A certain allowance may nevertheless be made in this connection whilst still permitting of a safe landing. This allowance may be marked on the vertical navigation instrument in the airplane. The pilot then merely requires to navigate the machine vertically in such fashion upon landing that the different movement of the instrument remains constant.

The angle of the glide path may be adjusted by means of the potentiometer 7 applying a more or less greater part of the output voltage of the receiver for horizontal navigation as regulation voltage to the receiver for vertical navigation, thus making the angle of the glide path to follow more or less steep. By means of resistance 5 it is possible to vary the length of the regulated path. If for instance the resistance 5 is set at a value such that only a small voltage increase puts the amplification of the tube 3 to its highest possible value, then the last part of the glide path is not regulated, because a further increase of the regulation voltage does not increase further the amplification of tube 3. Since the horizontal navigation is performed according to the method in which in a certain direction the signals supplement each other to form a steady line, care must be taken in the output of the horizontal navigation receiver that in the case of small deviations from the exact horizontal path the regulating potential corresponds with the mean value of the two signals, which may be accomplished by a network with corresponding time constant.

What we claim as new and desire to secure by Letters Patent is:

1. In means for assisting the landing of aircraft, means for transmitting signals from the aircraft, directionally sensitive aerials on the ground by which said signals are received, means for establishing answer-back signals from ground to aircraft, a vertical navigation receiver on the ground and connected with one of said aerials, and means including a horizontal navigation receiver connected to another of said aerials for so varying automatically from a predetermined point of approach of the aircraft the amplification of said vertical navigation receiver to vary a characteristic of the answer-back signals so that the pilot in order to maintain a constant intensity of reception of the answer-back signals is compelled to descend at an angle intersecting the levels in the field of the receiver for the vertical navigation.

2. In a means for assisting the landing of aircraft, a transmitter on board the aircraft, a vertical navigation receiver and a directionally sensitive aerial therefor located on the ground, a horizontal navigation receiver and a directionally sensitive aerial therefor, said receivers being constructed to receive signals transmitted from the aircraft, an aerodrome transmitter and an aerial therefor for transmitting answer-back signals to the aircraft, operative means connecting said vertical navigation receiver and said horizontal navigation receiver respectively to said aerodrome transmitter for affecting a characteristic of the answer-back transmission, a receiver on the aircraft for receiving the answer-back signals, means for varying the amplification of said vertical navigation receiver in accordance with the output of the horizontal navigation receiver, and instruments on the aircraft for indicating the horizontal and vertical navigation necessary in view of the signals received.

3. In a means for assisting the landing of aircraft, a transmitter on board the aircraft, directionally sensitive aerials on the ground, a vertical navigation receiver, a horizontal navigation receiver and a marker signal receiver each receiver being connected to a different one of said aerials, the said receivers being adapted to receive signals transmitted by the aircraft, an answer-back signal transmitter, operating connections between said marker signal receiver and said horizontal and said vertical navigation receivers, operating connections between said horizontal and vertical navigation receivers respectively and said answer-back transmitter for affecting a characteristic of transmission of answer-back signals to the aircraft automatically, a receiver on the aircraft for receiving the said answer-back signals, a relay operatively connected with said marker signal receiver for energization by the output voltage thereof, said relay including means for coupling the vertical navigation receiver with the output circuit of the horizontal navigation receiver so that the output potential thereof will act on the amplification of the vertical navigation receiver, and instruments on the aircraft indicating the horizontal and vertical navigation necessary in accordance with the signals received.

4. In a means for assisting the landing of aircraft, a transmitter on board the aircraft, directionally sensitive aerials on the ground, a vertical navigation receiver connected with one of said aerials, a horizontal navigation receiver and a marker signal receiver connected with others of said aerials, the marker signal receiver being actuated by signals transmitted by the aircraft when the aircraft flies over the same, an answer-back signal transmitting means, means operatively connecting said receivers with one another and with said answer-back signal transmitting means for transmitting answer-back signals to the aircraft automatically, a receiver on the aircraft for receiving said answer-back signals, a relay operatively connected with said marker signal receiver for energization by the output voltage thereof, said relay including means for coupling the vertical navigation receiver with the output circuit of the horizontal navigation receiver, and means for adjusting the effective action of said horizontal navigation receiver.

5. In a means for assisting the landing of aircraft, a transmitter on board the aircraft, directionally sensitive aerials on the ground, a vertical navigation receiver connected with one of said aerials and having an intensity regulating tube, a horizontal navigation receiver and a marker signal receiver connected with others of said aerials, said marker signal receiver being actuated in response to signals transmitted by the aircraft when the latter flies over said marker signal receiver, an answer-back signal transmitter, operating connections between said marker signal receiver and said horizontal and said vertical navigation receivers respectively and said answer-back signal transmitter and including means to couple the intensity regulating tube with the output circuit of the horizontal navigation receiver, a variable resistance acting in the circuit of the tube of the vertical navigation receiver for varying the working point of the characteristic of said tube, and instruments on the aircraft indicating the horizontal and vertical navigation necessary in accordance with the signals received.

KARL BAUMANN.
ARMIN ETTINGER.